United States Patent
Wen et al.

(10) Patent No.: US 11,308,365 B2
(45) Date of Patent: Apr. 19, 2022

(54) IMAGE CLASSIFICATION SYSTEM

(71) Applicant: Expedia, Inc., Bellevue, WA (US)

(72) Inventors: Li Wen, Redmond, WA (US); Zhanpeng Huo, Shenzhen/Guangdong (CN); Jingya Jiang, Bellevue, WA (US)

(73) Assignee: Expedia, Inc., Seattle, WA (US)

( * ) Notice: Subject to any disclaimer, the term of this patent is extended or adjusted under 35 U.S.C. 154(b) by 31 days.

(21) Appl. No.: 16/440,859

(22) Filed: Jun. 13, 2019

(65) Prior Publication Data
US 2020/0394441 A1 Dec. 17, 2020

(51) Int. Cl.
*G06K 9/62* (2006.01)
*G06N 20/00* (2019.01)

(52) U.S. Cl.
CPC .......... *G06K 9/627* (2013.01); *G06K 9/628* (2013.01); *G06K 9/6253* (2013.01); *G06N 20/00* (2019.01)

(58) Field of Classification Search
CPC ...... G06K 9/627; G06K 9/6253; G06K 9/628; G06N 20/00
USPC ...................................................... 382/156
See application file for complete search history.

(56) References Cited

U.S. PATENT DOCUMENTS

| 2019/0122077 A1 | 4/2019 | Tsishkou et al. |
| 2019/0199511 A1* | 6/2019 | Kyakuno ................. G06N 3/04 |
| 2019/0220972 A1* | 7/2019 | Iwanaga ............... G06T 7/0006 |

OTHER PUBLICATIONS

Yan, HD-CNN:Hierarchical Deep Convolutional Neural Networks for Large Scale Visual Recognition, 2015 (Year: 2015).*
Rehman "Difference between serial and parallel processing", ITRelease, Nov. 2017 (Year: 2017).*
Zhu et al, "B-CNN: Branch Convolutional Neural Network for Hierarchical Classification", arXiv.org 2017 (Year: 2017).*
International Search Report dated Sep. 29, 2020 for International Patent Application No. PCT/US20/36092. 14 pages.

* cited by examiner

*Primary Examiner* — Mark Roz
(74) *Attorney, Agent, or Firm* — Knobbe, Martens, Olson & Bear, LLP (57) ABSTRACT

An image classification system is provided for determining a likely classification of an image using multiple machine learning models that share a base machine learning model. The image classification system may be a browser-based system on a user computing device that obtains multiple machine learning models over a network from a remote system once, stores the models locally in the image classification system, and uses the models multiple times without needing to subsequently request the machine learning models again from the remote system. The image classification system may therefore determine likely a classification associated with an image by running the machine learning models on a user computing device.

20 Claims, 9 Drawing Sheets

IMAGE CLASSIFICATION SYSTEM

BACKGROUND

Computing devices are often used to view and interact with images. For example, a computing device may receive an image and automatically classify the image using labels or identifiers. Some computing devices may train machine learning models used to classify images so that the models are likely to correctly identify or associate labels with any received image. During operation, a computing device may use various machine learning models to associate an image with particular labels, identifiers, or other classifications. A user may then confirm the computer-generated classification, or select a different classification.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

The present disclosure is directed to an image classification system for determining a likely classification of an image using multiple machine learning models that share a base machine learning model. The image classification system may be a browser-based system on a user computing device that obtains multiple machine learning models over a network from a remote system once, stores the models locally on the user computing device, and uses the models multiple times without subsequently requesting the models again from the remote system. The image classification system may therefore determine likely classifications associated with images by running the machine learning models on a user computing device any number of times, for any number of images, without making remote application programming interface (API) calls to the remote system.

Conventional systems for image recognition are associated with a number of costs and inefficiencies. Images are often uploaded to a computing device and then categorized manually. For example, after a user uploads a photo of a hotel room, the user may manually scroll through a menu to select a predetermined category from a list of possible categories. The user may need to repeat the process multiple times if the user wishes to associate the image with multiple categories, upload multiple photos, etc. Problems also exist when utilizing conventional machine learning systems to predict a category associated with an image. For example, some conventional systems rely on one model to determine multiple possible labels associated with an image, which may lead to poorly-trained models and inaccurate predictions. As another example, some conventional systems rely on multiple complete models to determine different classifications, and execution of the multiple models may result in redundant execution of certain operations or overall inefficient use of computing resources. As yet another example, some conventional image categorization systems using machine learning may place a burden on the user's computing resources or cause unacceptable user-perceived latency because a remote API call may be executed each time a user executes the image categorization process, or retrieval of the machine learning model(s) may occur before or during each image classification session.

Aspects of the present disclosure address, among other things, issues with image classification such as those discussed above. More specifically, an image classification system obtains, from a remote system, multiple machine learning models and stores the models in a local persistent data store. The models may then be quickly accessed by the image classification system without necessarily requiring additional requests to the remote system. The set of models may include a base machine learning model—also referred to as a "base model"—and multiple additional machine learning models—also referred to as "work models." The work models are each configured to accept and analyze the output of the base model. Thus, the base model may be executed once for a particular image, and the output of the base model may be analyzed by multiple work models to perform classification tasks. Generating base model output once for a particular image and caching the base model output allows it to be available for processing by any number of work models serially, in parallel, or asynchronously, without the need to regenerate the base model output for each work model. Moreover, by separating out the operations performed by the base model and executing the operations once for any particular image, the work models may each be smaller, include fewer operations, be more efficient to train, and require less time and computing resources to execute that if the work models each included the operations—or some analogue thereof—of the base model.

In some embodiments, the work models are configured to determine classifications of images in one or more levels of an image classification hierarchy. As an example, a user may indicate that a particular image is associated with a "pool" category classification label. The image classification system may then determine a likely item-specific classification label indicating the type of pool using work models specifically trained on pool images to determine the type of pool depicted in the image. The item-specific classification may be "likely" in the sense that, based on output of the work model(s), the classification satisfies one or more classification criteria (e.g., the classification is associated with a score that satisfies a minimum threshold, the classification is associated with a score that is at least a threshold amount greater than a score associated with second-highest scoring classification, etc.).

Although aspects of some embodiments described in the disclosure will focus, for the purpose of illustration, on particular examples of classifications, labels, devices, frameworks, machine learning models, algorithms, and the like, the examples are illustrative only and are not intended to be limiting. In some embodiments, the techniques described herein may be applied to additional or alternative classifications, labels, devices, frameworks, machine learning models, and algorithms. Various aspects of the disclosure will now be described with regard to certain examples and embodiments, which are intended to illustrate but not limit the disclosure.

Image Classification Environment

Figure 1:
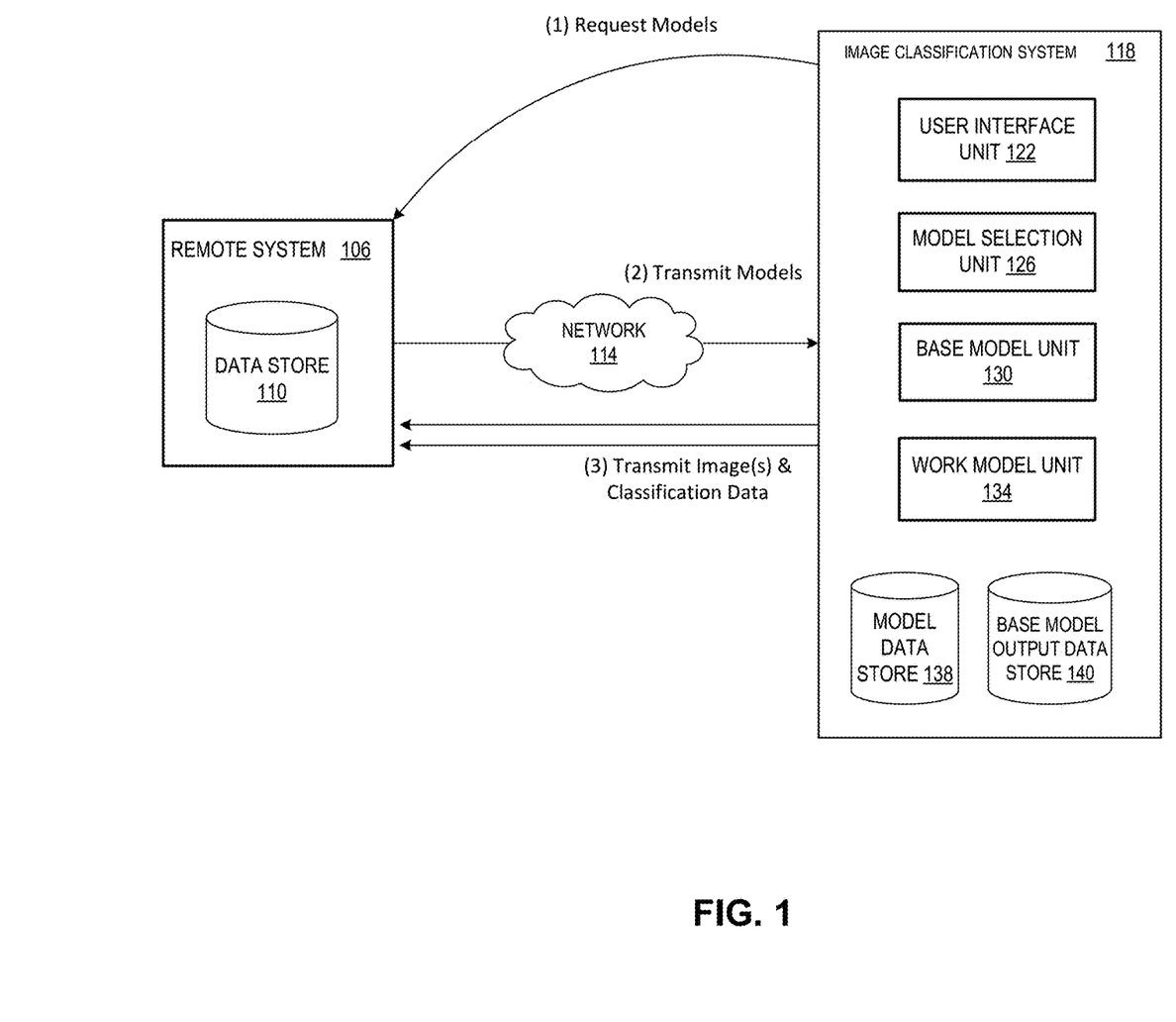
FIG. 1 is a block diagram of an illustrative computing environment including an image classification system according to some embodiments.

With reference to an illustrative embodiment, FIG. 1 shows an example network environment in which aspects of the present disclosure may be implemented. As shown, the network environment may include a remote system 106 and an image classification system 118. The image classification system 118 and remote system 106 may communicate with each via one or more communication networks 114. A communication network 114 (also referred to simply as a "network") may be a publicly-accessible network of linked networks, possibly operated by various distinct parties, such as the internet. In some embodiments, the communication network 114 may be or include a personal area network ("PAN"), local area network ("LAN"), wide area network ("WAN"), global area network ("GAN"), or some combination thereof, any or all of which may or may not have access to and/or from the internet.

Generally described, a remote system 106 may be a computing system operated by an entity (e.g., an enterprise or a user). For example, remote system 106 may be configured to manage listings and images of items, such as real property offered for sale or rent. The remote system 106 may host and provide network resources, such as web pages, mobile device applications, scripts, programs, or the like. The network resources may include information about the items, including images associated with the items based on user-specified or automatically determined classifications of the objects, locations, and/or themes depicted within the images.

In some embodiments, the remote system 106 may comprise a data store 110. In some embodiments, data store 110 may be configured to store machine learning models that may be transmitted to image classification system 118. In some embodiments, the image classification system 118 may transmit each uploaded image and associated classification data to remote system 106 to be stored in data store 110.

In some embodiments, as shown in FIG. 1, an image classification system 118 may comprise a user interface unit 122, model selection unit 126, base model unit 130, work model unit 134, model data store 138, and base model output data store 140. In some embodiments, user interface unit 122 may generate a user interface that allows for user interaction. For example, user interface unit 122 may receive a network resource from a server, such as the remote system 106. The user interface unit 122 may generate a display of the network resource, including interactive controls allowing a user to initiate upload of one or more images to the remote system 106, and classification of the images using the image classification system 118. In some embodiments, model selection unit 126 may access model data store 138 and select machine learning models to classify an image to be uploaded to the remote system 106. For example, model selection unit 126 may select a base model as well as one or more work models. In some embodiments, the machine learning models stored in model data store 138 are convolutional neural network models.

While the example of FIG. 1 displays a limited set of image classification system components, it will be appreciated that other arrangements may exist in other embodiments.

Image Classification Using a Base Model and Multiple Work Models

Figure 2:
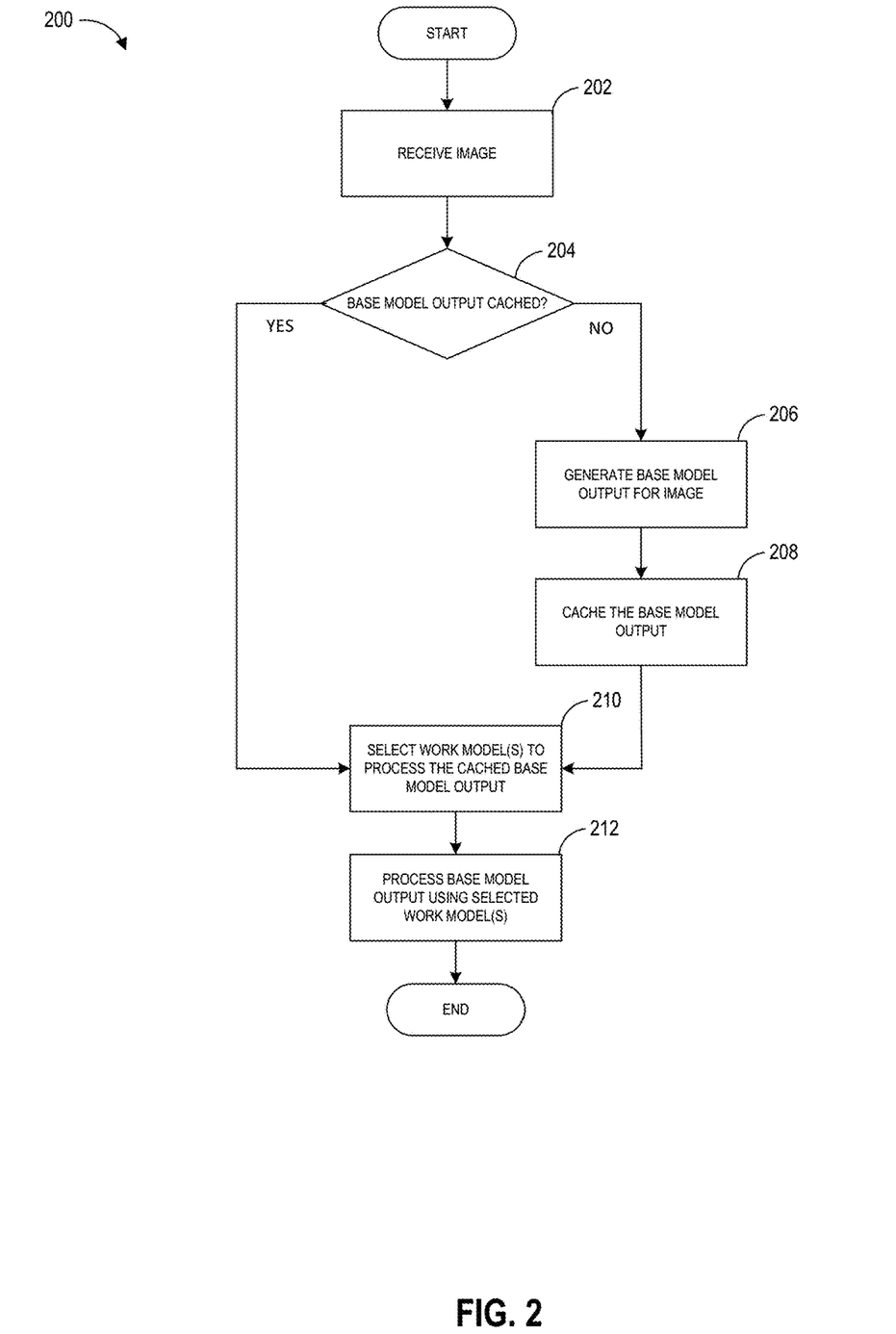
FIG. 2 is a flow diagram of an illustrative process for image classification using a base model and multiple work models according to some embodiments.

FIG. 2 shows an example process 200 that may be executed by the image classification system 118 to classify an image using a base model and multiple work models that process the same base model output. For example, the process 200 may use the base model network 300 and work model networks 302 shown in FIG. 3.

Figure 7:
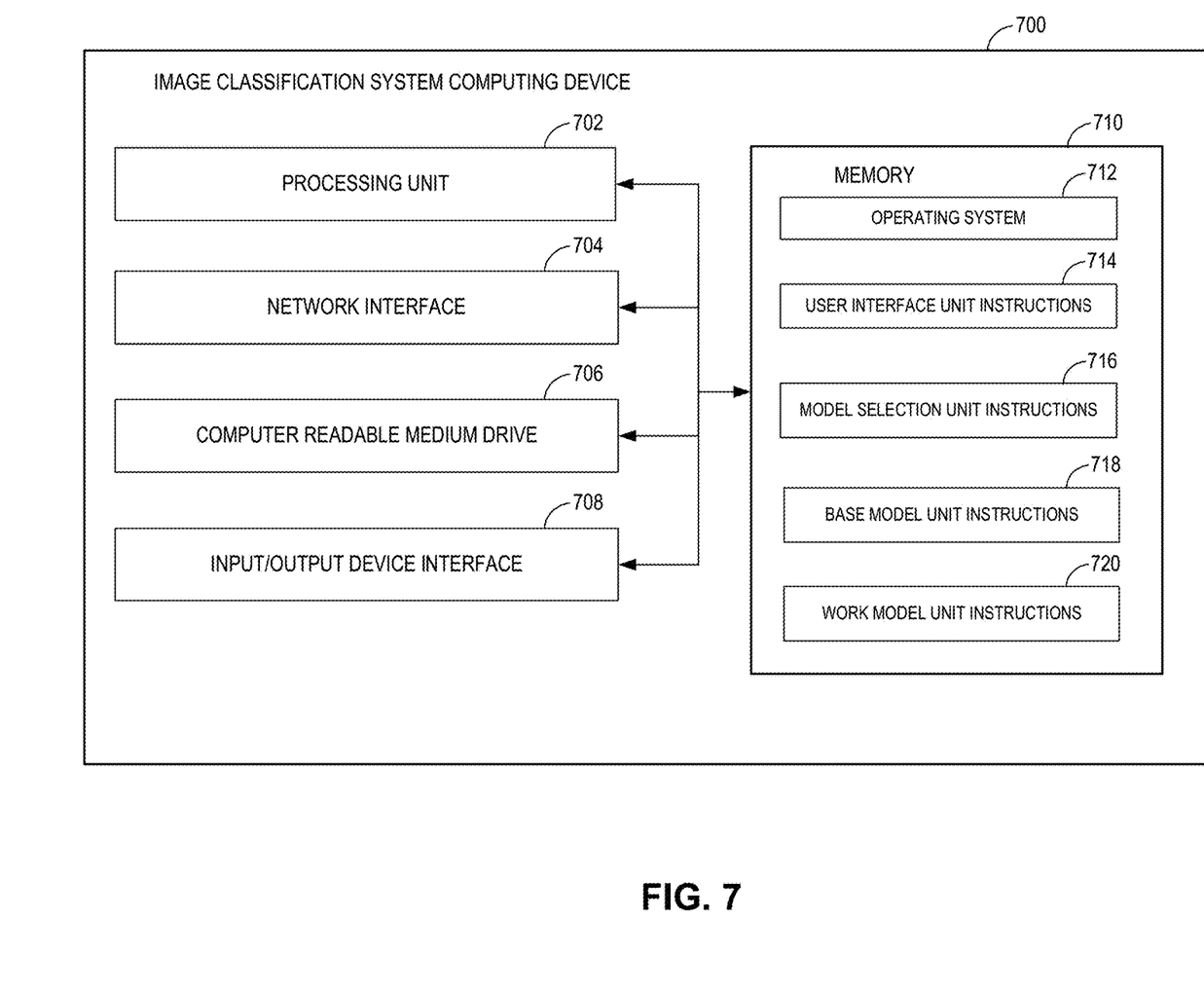
FIG. 7 is a block diagram of an illustrative computing system configured to implement features of the present disclosure according to some embodiments.

When process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the image classification system computing device 700 shown in FIG. 7. In some embodiments, process 200 or portions thereof may be implemented on multiple processors (on the same or separate computing devices), serially or in parallel.

At block 202, the image classification system 118 may obtain an image to be classified. For example, the image classification system 118 may receive an image selected by a user.

At decision block 204, the image classification system 118 can determine whether base model output for the image has been cached. The image classification system 118 can check the base model output data store 140 to determine whether base model output for the image exists. For example, the base model output data store 140 may include base model output for the most recent image for which base model output was generated by the base model unit 130. As another example, the base model output data store 140 may include base model output for each image classified by the image classification system 118. As a further example, the base model output data store 140 may include base model output representing only a subset of the images classified by the image classification system 118 (e.g., only the most recent x images were x is a number, only base model outputs that can fit within a maximum size of the data store 140, etc.). In some embodiments, the base model output stored in the base model output data store 140 may be associated with an identifier, such as a hash of the image, a name of the image, or some other unique identifier.

If base model output for the current image is available in the base model output data store 140, the process 200 may proceed to block 210. Otherwise, if no base model output for the current image is available, the process 200 may proceed to block 206.

At block 206, base model unit 130 may analyze the image using a base model, such as a base model stored in the model data store 138. In some embodiments, the base model unit 130 may first generate base model input representing the image, such as base model input in the form of a feature vector of data derived from the image. In some embodiments, the base model input may be the image itself, a scaled version of the image, or some other standardized or otherwise preprocessed form of the image for analysis by the base model. The base model unit 130 may process the base model input using the base model to generate base model output. In some embodiments, the base model output may be a feature vector. The feature vector may be a multi-dimensional vector (e.g., a 1,280-dimensional vector) of data representing the image in a form that can be input into—and processed by—one or more of the work models. Such a feature vector may be referred to as a base model output vector.

At block 208, the base model unit 130 can store the base model output in the base model output data store 140. Generating base model output once for a particular image and storing it in the base model output data store 140 allows the base model output to be available for processing by any number of work models (serially, in parallel, or asynchronously) without the need to regenerate the base model output for each work model.

At block 210, the model selection unit 216 or some other component of the image classification system 118 can select one or more work models to be used in processing of the base model output for the current image. For example, an image may be associated with a top level, a middle level, and/or a bottom level of a multi-level hierarchy. The model selection unit 126 may select a work model configured to determine a likely top level classification, a work model configured to determine a likely middle level classification, and/or a work model configured to determine a likely bottom level classification.

At block 212, the work model unit 134 may process the base model output for the current image using the selected work model(s). Each work model may use the base model output as an input, and each work model may output a classification, or data from which a likely classification can be determined. In some embodiments, work model unit 134 may execute multiple work models concurrently, wherein each work model is trained for a specific task. For example, the image classification system may be configured to analyze images with respect to a multi-level hierarchy in which one level corresponds to groups of categories, a second level corresponds to individual categories within higher-level category groups, and a third level corresponds to subcategories within higher-level categories. Subcategories may also be referred to as items. The work model unit 134 may execute a work model configured to "predict" or otherwise determine a likely category group label associated with an image (e.g., property features), a work model configured to determine a likely category associated with the image (e.g., pools), and/or a work model configured to determine a likely item label associated with the image (e.g., outdoor pool). It will be appreciated that, in some embodiments, work model unit 134 may execute work models serially (e.g., one at a time) or asynchronously rather than concurrently. Illustratively, work models may be trained specifically to predict a narrow range of categories, labels, or other identifiers. Thus, each work model may advantageously require less computing resources to store and execute in comparison to the base model. For example, an example base model may be 100 MB in size and may take 1 second to execute, while a work model may be 1% of the base model's size and take only 0.01 seconds to execute.

Model Architecture

Figure 3:
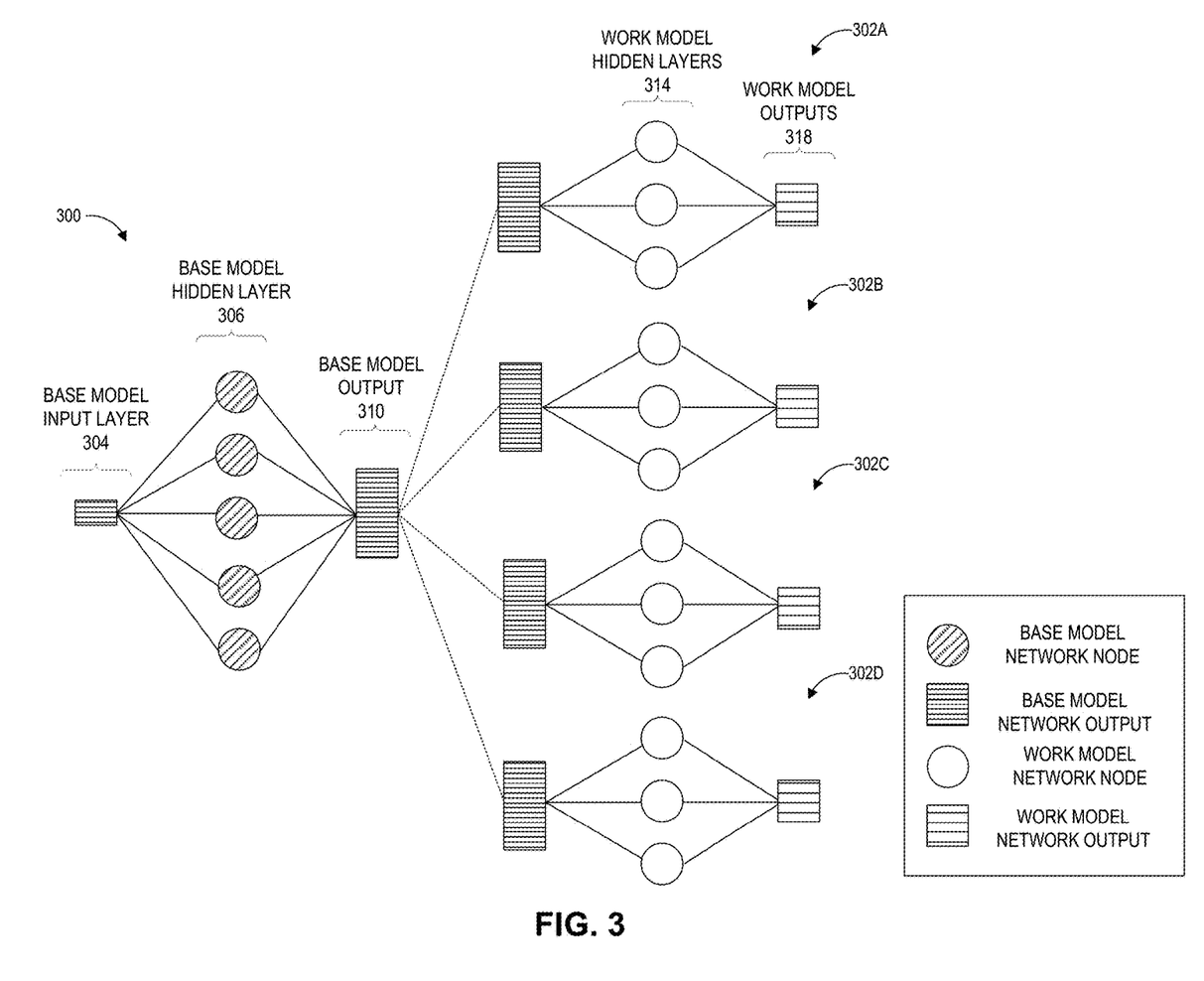
FIG. 3 is a visual representation of an example model architecture utilized by an image classification system according to some embodiments.

FIG. 3 is a visual representation of an example model architecture utilized by an image classification system 118 according to some embodiments. In contrast to traditional machine learning systems that rely on a single machine learning model to handle likely classification determinations for any and all categories or for every possible item label into which the system may classify an image, the image classification system 118 may instead process an image via multiple machine learning models, some of which process the output of one or more other models, produce a subset or superset of classification determinations of other models, etc. By avoiding use of a single large machine learning model, the image classification system 118 may maintain highly accurate predictions while advantageously lowering the burden on computing resources by only executing small, well-trained work models as necessary.

The models used by the image classification system 118 may be implemented as neural networks. Generally described, neural networks have multiple layers of nodes. Illustratively, a neural network may include an input layer, an output layer, and any number of intermediate or "hidden" layers between the input and output layers. The individual layers may include any number of separate nodes. Nodes of adjacent layers may be connected to each other, and each connection between the various nodes of adjacent layers may be associated with a respective trainable parameter or "weight." Conceptually, a node may be thought of as a computational unit that computes an output value as a function of a plurality of different input values. The input values may include the output of nodes in a previous layer, multiplied by weights associated with connections between the nodes in the previous layer and the current node. When a neural network processes input data in the form of an input vector or a matrix of input vectors, the neural network may perform a "forward pass" to generate a matrix of output vectors. The input vectors may each include n separate data elements or "dimensions," corresponding to the n nodes of the neural network input layer (where n is some positive integer). Each data element may be a value, such as a floating-point number or integer. The forward pass includes multiplying the matrix of input vectors by a matrix representing the weights associated with connections between the nodes of the input layer and nodes of the next layer, and applying an activation function to the results. The process is then repeated for each subsequent neural network layer until an output is generated.

In some embodiments, convolutional neural networks such as the NASNet large model, Inception_V3 model, Inception_V4 model, Mobilenet_V2_1.0_224, and Mobilenet_V2_1.0_224_quant models may be utilized as a base model to apply on an image. A base model may be selected based upon considerations such as file size and accuracy. For example, the Mobilenet_V2_1.0_224_quant model may be selected for its small file size (e.g., 3.4 MB), while the NASNet large model may be chosen for enhanced accuracy at the expense of an increased file size (e.g., 355.3 MB).

As shown in FIG. 3, the image classification system 118 may use a set of neural networks, including a base model network 300 and multiple work model networks 302A, 302B, 302C, and 302D. An image is processed through the base model network 300 (shown as a set of diagonally-shaded nodes) to generate a base model output 310. The base model output 310 is passed as an input (subset of input) into one or more work model networks 302A, 302B, 302C, and/or 302D, collectively "302A-302D" or "302" (shown as sets of unshaded nodes). The work model networks 302 generate work model outputs 318 representing one or more classification determinations for the image.

The base model network 300 includes an input layer 304 that corresponds to an image selected or uploaded by a user. The base model network 302 further includes one or more hidden layers 306. While the base model hidden layer 306 is shown with 5 nodes, it will be appreciated that a different number of nodes (e.g., dozens, hundreds, or more) may be used in other embodiments. In addition, while base model hidden layer 306 is shown as a single layer, it will be appreciated that base model network 300 may be implemented as a deep neural network with multiple hidden layers, each of which may or may not have a same number of nodes as any other hidden layer of the base model network 300. For example, a base model network 300 may have 20, 40, or more base model hidden layers 306.

In some embodiments, the base model output 310 may comprise a multi-dimensional vector (shown as a rectangle comprising multiple entries). For example, the base model output 310 may be a 1,280-dimensional output vector that is an encoded representation of the input image. The encoded representation includes information regarding the input image that is used by the various work model networks 302 to determine likely classifications of the image. The base model network 300 may be run only once per image, and the base model output 310 may cached and/or provided to any number of work model networks 302 without re-running the base model network 300. Advantageously, the image classification system 118 may rely on client-side execution to run the base model network 300. For example, the image classification system 118 run a base model network 300 within a browser or other client-side application by taking advantage of client-side graphics processing units and WebGL.

The output 310 of the base model network 300 is input to one or more work model networks 302. In a single example, the multi-dimensional vector may be passed through one or more work model hidden layers 314 of a work model 302A. The work model 302A may generate work model output 318 (shown as sparsely shaded square). In some embodiments, a work model hidden layer 314 may be a 256-dimension neural network layer utilizing a rectified linear unit (ReLU) or rectifier as an activation function. While each work model network 302 is illustrated as a 3-layer neural network, it will be appreciated that in some embodiments, the work model networks may include additional work model hidden layers (e.g., to potentially improve the accuracy of the classification determinations) or no work model hidden layers (e.g., to minimize the overall size and complexity of the work model networks, to reduce the amount of computing resources required to train, transmit, store, and use the work model networks 302, etc.). In addition, while each work model network 302 is shown having an identical structure, in some embodiments the work model networks may have different structures (e.g., some work model networks may have different numbers of work model hidden layers and/or different numbers of nodes per layer than other work model networks).

The work model output 318 from any particular work model network 302 may include a set of elements such as a vector or array, and each element may correspond to a particular classification that the work model network 302 is configured to determine. The value of an individual element may represent a likelihood that the image is properly classified as the classification of the corresponding element. Thus, work model output 318 may include likelihoods that the image corresponds to each of the classifications that the work model is configured to determine. In some embodiments, work model output 318 may be generated using a softmax function as an activation function.

In some embodiments, the image classification system 118 may include a confidence score threshold such that only accurate or confident suggestions are displayed to the end user. A work model utilizing a softmax function may automatically calculate, in an output layer, a likelihood that the image is properly classified in each possible classification that the work model is configured to determine. For example, the work model may generate, for each possible classification, a floating point number ranging between a minimum and a maximum value (e.g., between 0.0 and 1.0) for each classification. The floating point numbers for each of the classifications may sum to a predetermined value (e.g., 1.0). The image classification system 118 may only present a recommendation of a particular classification or result to the end user if the corresponding likelihood calculated by the softmax function satisfies a certain threshold (e.g., display only if the probability is greater than 0.5). In some embodiments, the image classification system 118 may only present a recommendation of a particular classification based on additional or alternate criteria, such as only when the corresponding likelihood is at least a threshold amount greater than the second-highest likelihood determined for the set of possible classifications. It will be appreciated that in some embodiments, other algorithms or functions may be used In embodiments in which each work model is configured and trained to determine likely classifications according to specific levels of a hierarchy (e.g., a work model network to determine a likely top-level category group, a work model network for each category group to determine a likely category within the category group, a work model network for each category to determine a likely item within the category, etc.), each work model network may be well-trained for its specific task and yield higher accuracy in comparison to one general model configured to make a classification determination among hundreds of possible options (e.g., among all possible items). Utilizing multiple work model networks rather than relying on one larger model may also allow the system to make detailed classification determinations on subcategories without overlapping the subcategories.

In some embodiments, each work model network 302 may advantageously be invoked using only one line of code and may require significantly less computing resources than the base model network 300. For example, assuming the user uploads a photograph of a swimming pool, the image classification system 118 may dedicate computing resources to execute only those work model networks 302 that are specifically trained to predict a type of swimming pool.

The base model network 300 and each work model network 302 may be trained using training data. For example, base model network 300 and/or individual work model networks 302 may be trained on images that are real-world photos (e.g., PNG formatted files comprising at least 650 pixels in scale for width and height, and using 24-bit color). The user may provide any number of labeled images for training (e.g., 2,000 photos per item), and the model(s) may then learn to properly label images.

Advantageously, the image classification system 118 may use one or more work model networks while taking into account a user's interactive selections. For example, if a user interacts with a user interface in a way indicating that the image is associated with the category label "pool" (e.g., by selecting a category label from a drop-down menu), a work model network trained to determine a likely item label associated with the category "pool" (e.g., indoor pool, outdoor pool, or children's pool) may be selected and executed.

Hierarchical Image Classification

Figure 4:
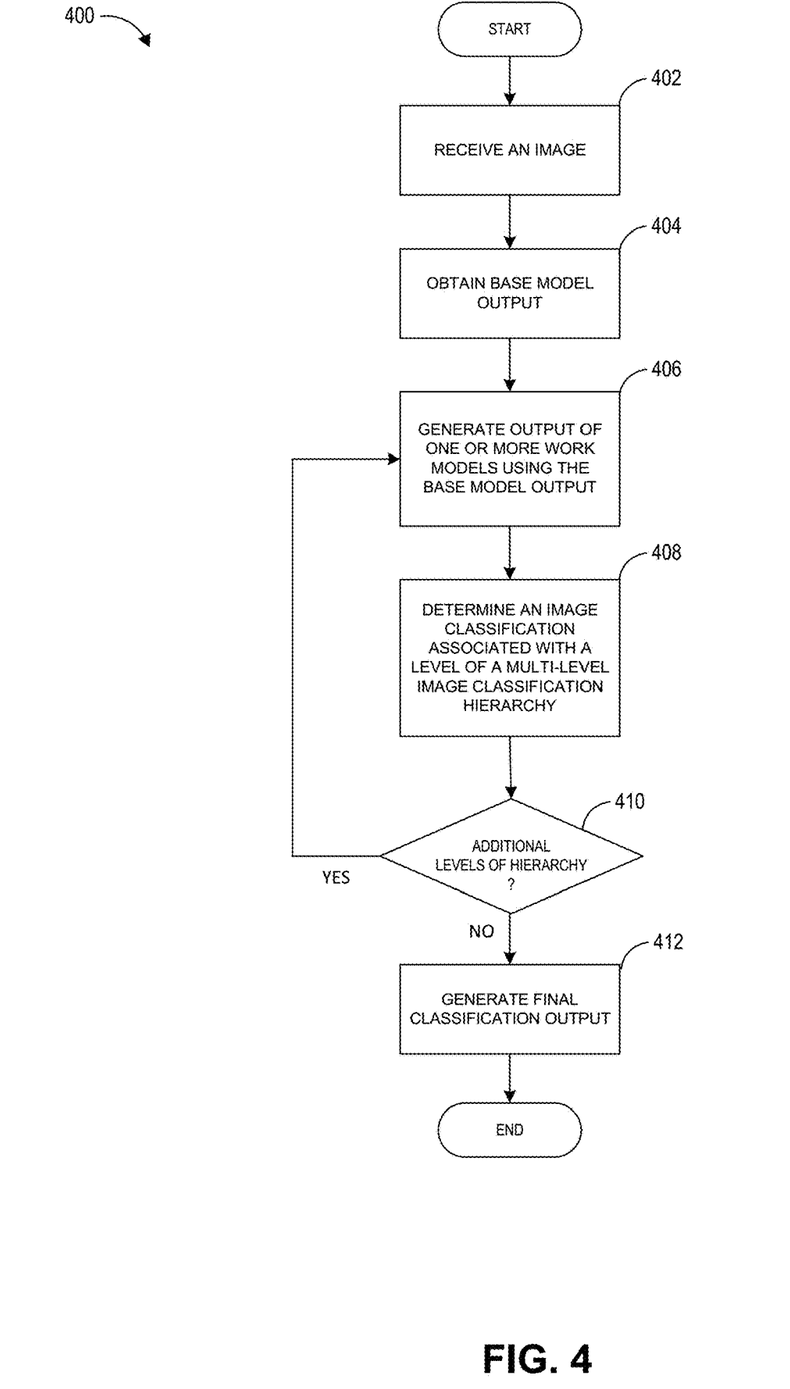
FIG. 4 is a flow diagram of an illustrative process for image classification using an image classification hierarchy according to some embodiments.

FIG. 4 is a flow diagram of an illustrative process 400 for hierarchical image classification according to some embodiments. When process 400 is initiated, a set of executable program instructions stored on one or more non-transitory computer-readable media (e.g., hard drive, flash memory, removable media, etc.) may be loaded into memory (e.g., random access memory or "RAM") of a computing device, such as the image classification system computing device 700 shown in FIG. 7. In some embodiments, process 400 or portions thereof may be implemented on multiple processors (on the same or separate computing devices), serially or in parallel.

At block 402, the image classification system 118 may receive an image. For example, a user may select an image to be classified and uploaded to remote system 106. Illustratively, the image may be an image of a hotel room to be classified by the image classification system 118.

At block 404, the image classification system 118 may generate or otherwise obtain a base model output. As discussed above with respect to FIG. 2, the image classification system 118 may determine whether a base model output is already cached for the current image. In some embodiments, the base model output may be stored in base model output data store 140 or cached in a browser. If there is no base model output associated with the image, then the image classification system 118 may generate base model output by using the base model to process the image. The image classification system may then cache the base model output. The base model output may be cached in a browser or stored in base model output data store 140.

At block 406, the image classification system 118 may process the base model output using one or more work models based at least partly on a multi-level hierarchy. In some embodiments, model data store 138 may store multiple work models (e.g., dozens or hundreds of work models), and individual models may be associated with individual levels of a multi-level hierarchy for image classification. When block 406 is reached, the image classification system may only utilize models that are associated with a particular level or subset of levels of a hierarchy at block 406. For example, the first time block 406 is reached for a particular image, the image classification system 118 may use a work model (or multiple work models) associated with a lowest and/or highest level of the hierarchy. When block 406 is reached again for the same image, the image processing system may use a work model (or multiple work models) associated with higher and/or lower levels of the hierarchy than previously used. The particular level(s) of the hierarchy may depend on the number of times block 406 is reached for a particular image, interaction data representing user interactions with prior classifications, or other contextual information.

At block 408, the image classification system 118 may determine a classification associated with the image based on output of the work model(s) generated above. In some embodiments, a first classification may be associated with a broad, high-level label that may be associated with the image. For example, FIG. 6C illustrates an example image classification hierarchy. According to the example image classification hierarchy, an image may be associated with labels from a list of category group labels 650, category labels 652, and subcategory labels 654 (subcategory labels may also be referred to as item labels). In this embodiment, the lists of labels 650, 652, and 654 maintain a hierarchical relationship to each other. The category group labels 650 are the top-level labels and therefore the broadest, and may comprise a limited number (e.g., 3) of possible options. Category labels 652 may include intermediate labels that further expand on a particular option in category group labels 650. For example, category labels 652 may include multiple "Property Features" labels that may be associated with the broad "Property Features" category group (e.g., Pool, Dining, Parking, etc.). Subcategory labels 654 may include lower-level labels that further expand on options in category labels 652 and correspond to the final labels to be applied to images. For example, subcategory labels 654 may include multiple labels associated with the "pool" category label (e.g., infinity pool, children's pool, indoor pool, outdoor pool, etc.). It will be appreciated that other arrangements of labels and identifiers may be used in other embodiments.

If a user uploads a picture of a hotel room, the first classification may be a broad label from category group labels 650, such as "property features." The image classification system 118 may also determine a second classification associated with the image, such as if a second work model, or a work model in a different level of the hierarchy, was used at block 406 above. For example, the second classification may be a more specific, lower-level label in the subcategory labels 654, such as "outdoor pool."

Returning to FIG. 4, at decision block 410 the image classification system 118 may determine whether to process the image using work models at additional levels of the classification hierarchy. The determination may be static (e.g., each level of the hierarchy is used), or dynamic (e.g., depending upon user interaction or other contextual information). If additional levels of the hierarchy are to be used, the process 400 returns to block 406; otherwise, the process proceeds to block 412.

At block 412, the image classification system 118 may determine or otherwise generate the final classification output (e.g., item label) for the image. The final classification output may be based on one or more classification criteria. For example, the final classification may be based on a comparison of individual outputs (e.g., the classification with the highest likelihood). As another example, the final classification may be based on user interaction (e.g., user selection of a likely classification). In some embodiments, the final classification may be based on additional, alternative, and/or combinations of classification criteria.

While the embodiment described above includes determining the first classification and second classification in a sequential order, it will be appreciated that other arrangements are possible in other embodiments. For example, in some embodiments, the image classification system may determine a likely first classification and a likely second classification simultaneously. In other embodiments, the image classification system may instead determine a likely second classification prior to determining the likely first classification. Furthermore, the disclosure is not limited to only two identifiers. In some embodiments, the image classification system may determine more than two categories or labels associated with the image.

Hierarchical Image Classification with User Interactions

Figure 5:
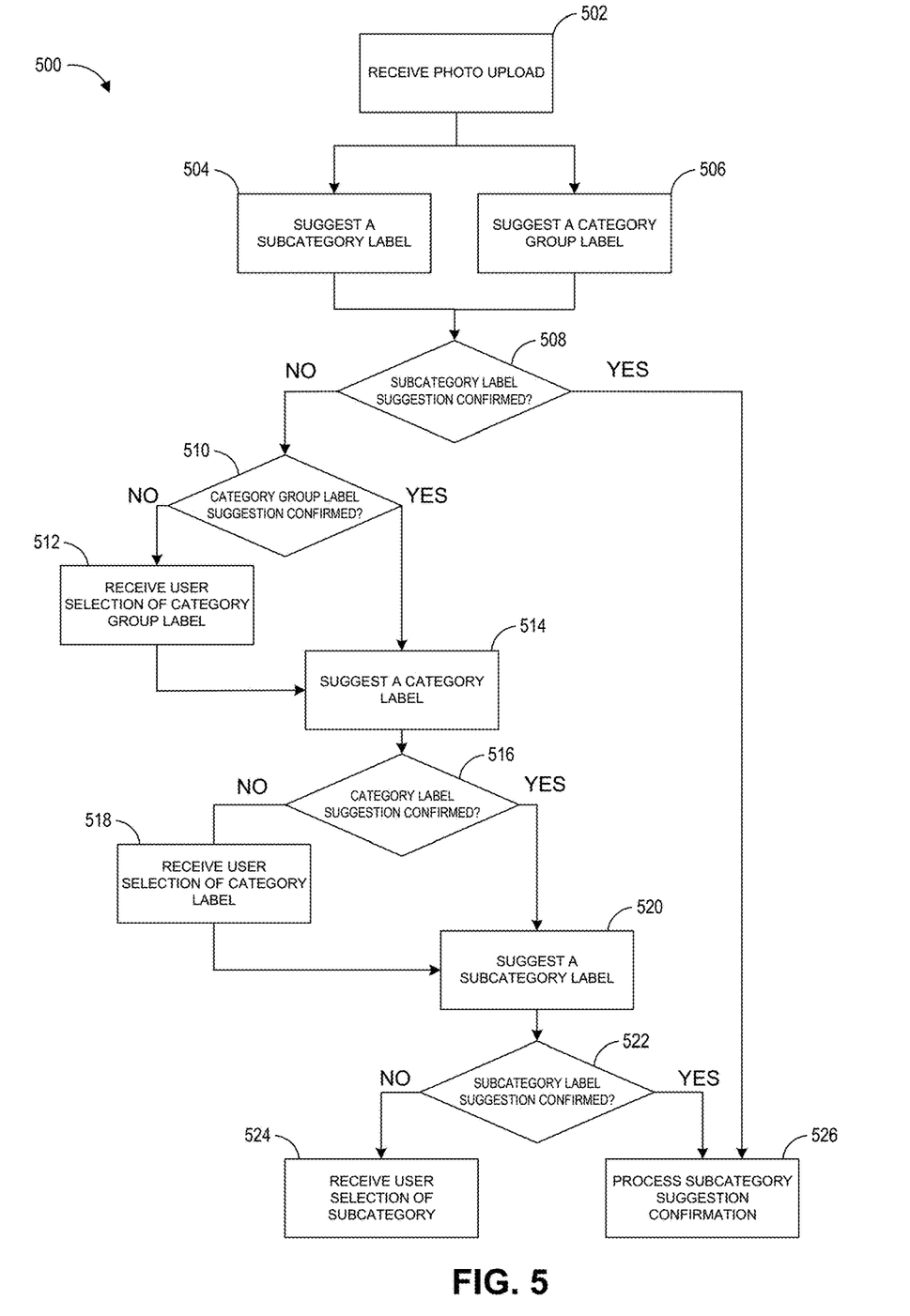
FIG. 5 is a flow diagram of another illustrative process for image classification using an image classification hierarchy according to some embodiments.

FIG. 5 is a flow diagram of an illustrative process 500 for hierarchical image classification using a three-level image classification hierarchy (e.g., as illustrated in FIG. 6C) and user interaction with likely classifications. The process 500 will be described with respect to the example user interfaces shown in FIGS. 6A and 6B. When process 500 is initiated, a set of executable program instructions stored on one or more non-transitory computer-readable media (e.g., hard drive, flash memory, removable media, etc.) may be loaded into memory (e.g., random access memory or "RAM") of a computing device, such as the image classification system computing device 700 shown in FIG. 7. In some embodiments, process 500 or portions thereof may be implemented on multiple processors (on the same or separate computing devices), serially or in parallel At block 502, the image classification system 118 may receive an image. For example, a user may upload an image of a hotel stored locally on a user computing device configured to execute the image classification system 118. The image classification system 118 may then suggest a subcategory label at block 504 and a category group label at block 506.

As discussed above, in some embodiments the image classification system 118 may first use a base model to process the received image and generate output, such as a multi-dimensional vector (e.g., a 1,280-dimensional vector), that may be used by multiple work models to determine likely classifications. The image classification system 118 may then cache the base model output for future use by a work model. The image classification system 118 selects one or more work models to determine likely classifications (e.g., categories or labels) associated with the image. In some embodiments, at least two work models are initially used to provide initial classification determines for the image. One work model may be used to determine a likely top-level classification for the image according to the multi-level image hierarchy that is being used, while another work model may be used to determine a likely lower-level classification for the image.

Figure 6A:
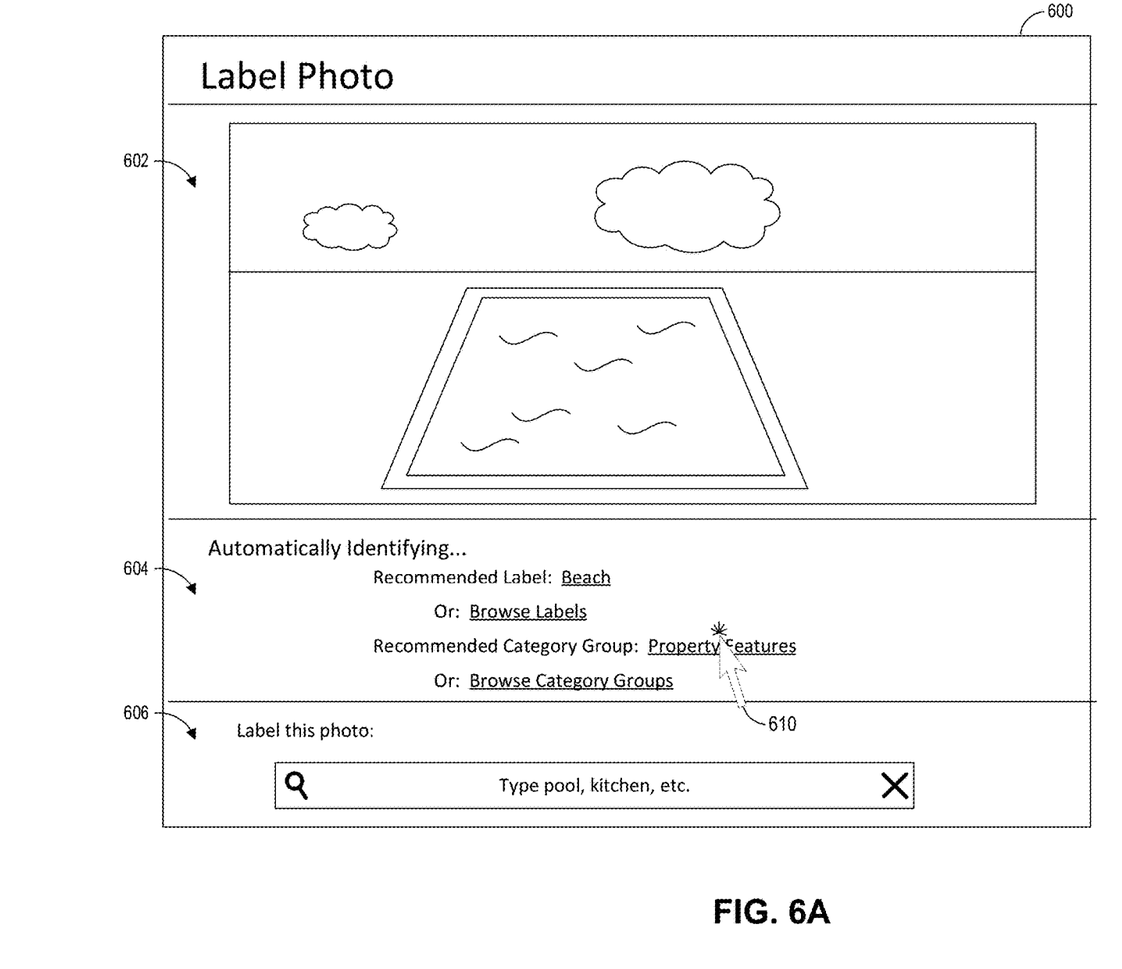
FIG. 6A is a user interface diagram of an image classification interface showing various interactive tools for uploading and classifying images according to some embodiments.
Figure 6B:
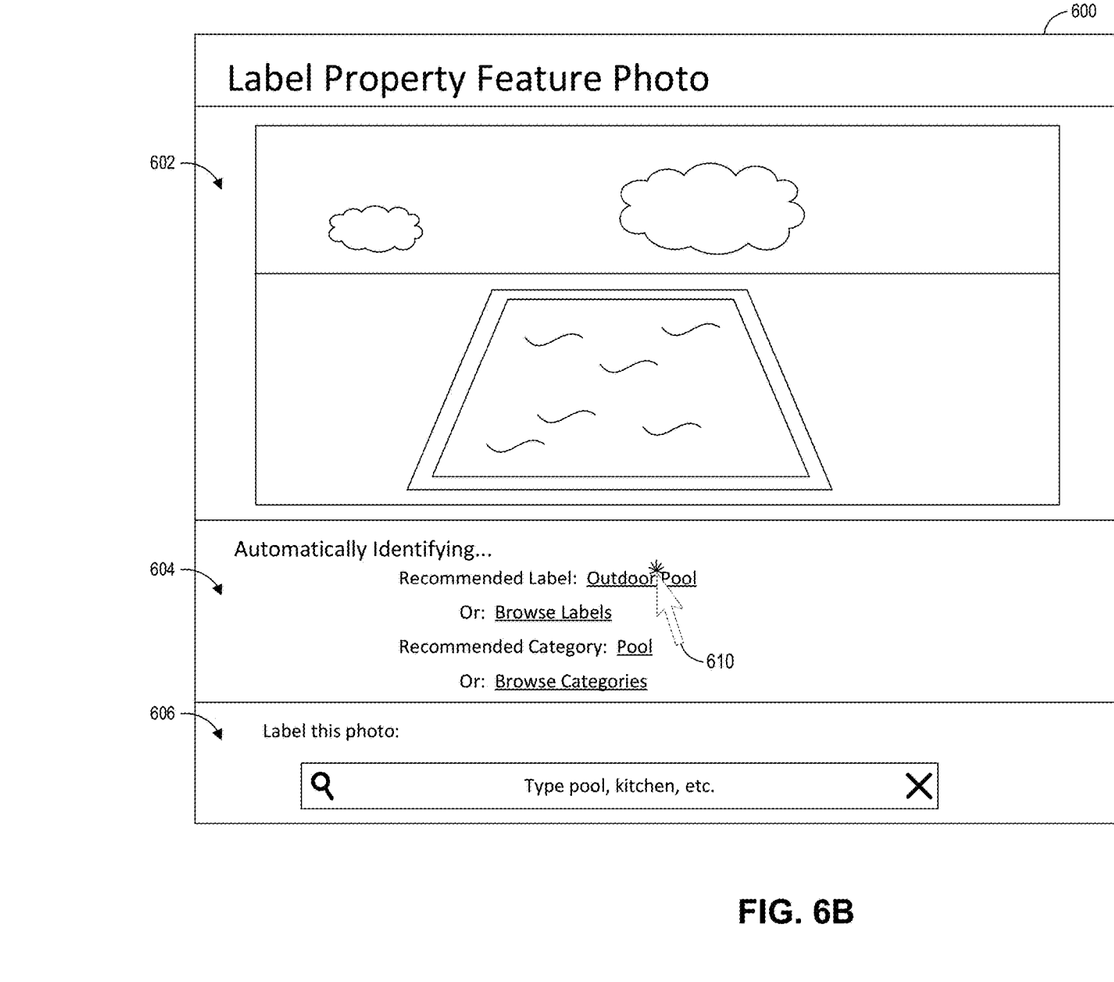
FIG. 6B is a user interface diagram of an image classification interface showing an assessment of an uploaded image according to some embodiments.
Figure 6C:
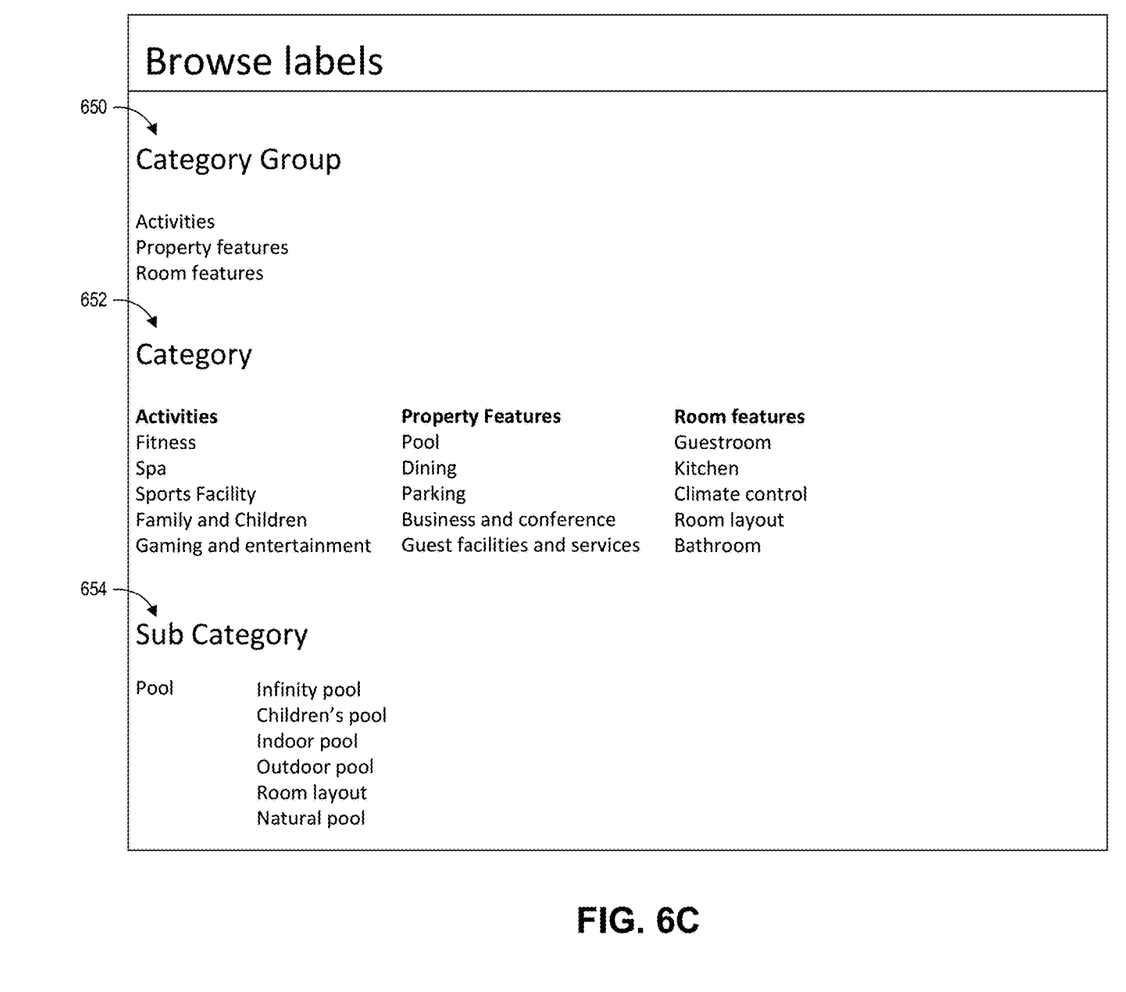
FIG. 6C is a diagram showing an image classification hierarchy according to some embodiments.

FIG. 6A shows an interface 600 through which a user uploads an image 602 (e.g., a photo of a swimming pool). The image classification system 118 may use one work model to process the base model output for the image 602 and initially determine that the image 602 likely belongs to a particular "category group" from the category group list 650 shown in FIG. 6C, such as the "property features" category group. The image classification system 118 may also use a second work model to process the same base model output for the image 602 and determine that the image 602 likely belongs to the "beach" subcategory. The determined classifications may be shown in the user interface 600, such as in an automatic identification portion 604. As shown, the automatic identification portion 604 may provide recommendations for one or more likely classifications: a top-level recommendation (category group), and lowest level recommendation (subcategory or item "label"). A user may accept the label recommended for the image 602 and complete the classification process, select the top-level recommendation to see a different selection of possibilities, or browse the labels or category groups. The user may also be permitted to bypass the automatic identification portion 604 altogether and provide a label or categorization using a manual entry portion 606. In some embodiments, the recommended classification(s) determined by the image classification system 118 may be displayed to the user only if the classification is associated with a score (e.g., a likelihood or confidence score) that exceeds a threshold. For example, if work model is trained to distinguish among more than 200 subcategories, the highest-scoring category may still have a score that is below a threshold, indicating that the accuracy of the determination may be low. A recommendation based on the output of the work model may be de-emphasized or suppressed from display in the automatic identification portion 604.

At decision block 508, the image classification system 118 may determine whether the lowest-level classification (e.g., the subcategory label suggestion) from block 504 is confirmed. In some embodiments, the image classification system 118 may confirm the accuracy of its prediction by waiting for a user input. For example, the image classification system 118 may show one or more recommended classifications, such as a top-level category group label and a lowest-level subcategory label, as discussed above. A user may select 610 one of the recommended classifications, browse other classifications, or manually enter a classification. If the user selects the lowest-level recommended subcategory label, the process 500 may proceed to block 526 where the selection is processed. Otherwise, if the user does not select the lowest-level recommendation (e.g., if the user selects the top-level recommendation or selects a control to browse top-level labels), the process 500 may proceed to decision block 510. As another example, the user may be presented, via a user interface, two selectable buttons displaying "YES" or "NO." A user may click the "YES" button to confirm a recommendation displayed on the user interface or click the "NO" button to indicate that the recommendation displayed on the user interface is not accurate.

At decision block 510, the image classification system 118 determines whether the user has selected or otherwise confirmed the top-level (e.g., category group) recommendation. If the user does not confirm the category group label suggestion, then the user may manually select a category group label at block 512. For example, upon seeing that the image classification system 118 suggested the category group label "Activities" for the uploaded image 602 (the picture of a swimming pool), the user may reject the suggestion by manually selecting a different category group (e.g., property features) from a linked browsable listing, a drop-down menu listing the category group labels, or some other control or interface. In some embodiments, the user may manually type a category group label to associate with the image, such as in the manual entry portion 606. In some embodiments, the initial determination of a subcategory label and category group label may be affected by a user's initial actions. For example, in some embodiments, the user may upload an image from a local device that the user would like to submit to remote system 106, and the user begins to browse predetermined labels (e.g., from a browsable listing linked displayed in the automatic identification portion 604). While the user is browsing labels, the image classification system 118 may recommend one category group out of the possible category groups for display to the user. In other embodiments, a user may upload an image and then actively select a top-level classification, such as a category group label. The image classification system 118 may then forego executing work models configured to generate a category group label recommendation in view of the user's own manual selection of a category group label. The image classification system 118 may instead execute a work model to determination a recommended intermediate level classification, such as a category label, associated with the image 602 given the selected category group label.

At block 514, once the user selects a top-level label, or if the initial top-level label recommendation is confirmed, the image classification system 118 may suggest an intermediate level label. As mentioned above, the image classification system 118 may execute a work model specifically trained to determine an intermediate level label, such as a category label, when a top-level label, such as a category group label, has been chosen. For example, if an image is associated with the "property features" category group label, the image classification system 118 may execute a work model specifically configured to determine a recommended category among more than 40 possible category options in the selected category group (e.g., fitness, spa, pool, dining, parking, kitchen, etc.). In some embodiments, the image classification system 118 may execute a work model specifically trained to determine a category given the user's previous selection of a category group. For example, assuming the user selects the "property features" category group label, the image classification system 118 may use a work model trained to determine a category associated with property features (e.g., pool, dining, parking, etc.) rather than predicting a category that may belong to a different category group (e.g., activities or room features). The image classification system 118 may then await user confirmation of the category label suggestion, or user selection of a different category label.

At decision block 516, the image classification system 118 may determine whether the user has selected the intermediate-level label recommendation, or made a different intermediate-level label selection. In some embodiments, the user may activate a link or button confirming the category recommendation.

At block 518, if the user has not confirmed the intermediate-level label recommendation, the user can select an intermediate-level label. For example, the user can select a category label from a list of category label options, or manually type a category label in manual entry portion 606 to associate with the image.

At block 520, the image classification system 118 may recommend a lower-level label, such as a subcategory label. The recommendation may be based at least partly on a prior selection by the user, such as a selectin of a top-level or mid-level label (e.g., a category group label or category label) already associated with the image. For example, if the user has manually selected a category group label (e.g., property features) and a category label (e.g., pool), the image classification system may use a work model trained to determine a likely subcategory (e.g., type of pool) given the selected category group label and the category label. In some embodiments, the work model may calculate a score (e.g., a likelihood) for each subcategory but only present the subcategory option with the highest score. In some embodiments, the image classification system 118 may present multiple subcategory recommendations simultaneously. Furthermore, the image classification system 118 may present subcategory recommendations based on a score threshold. For example, a work model may determine that the likelihood of the image being an indoor pool is 0.3, the likelihood of the image being an outdoor pool is 0.6, and the likelihood of the image being a children's pool is 0.1. However, the image classification system 118 may only display the outdoor pool recommendation to the user because that is the only subcategory option with a score that exceeds 0.5. It will be appreciated that the threshold may be adjusted or altered to suit the user's preferences. For example, the user may be interested in examining all subcategory recommendations regardless of the calculated scores. Once a subcategory label is recommended, the image classification system 118 may await user confirmation.

At decision block 522, the image classification system 118 can determine whether the user has selected the recommended low-level label. For example, the user may confirm the subcategory suggestion through a user input (e.g., activating a link or clicking a YES button). In the event that the user does not confirm the low-level label recommendation, the image classification system 118 may receive the user's manual selection of a low-level label such as a subcategory at block 524.

While the process 500 is described as recommending the subcategory label, category group label, and category label displayed or recommended in a particular order, it will be appreciated that other orders or arrangements may be used in other embodiments. For example, the image classification system 118 may initially simultaneously determine a likely or otherwise recommended subcategory label, a category group label, and a category label associated with the image. Additionally, while the example shown in FIG. 5 utilizes a hierarchical organization of labels (e.g., subcategory label is narrower than category label, which in turn is narrower than category group label), other embodiments do not necessarily require such an ordered relationship among the labels.

Example Device Components

FIG. 7 depicts a general architecture of a computing device 700 that includes an arrangement of computer hardware and software that may be used to implement aspects of the present disclosure. Illustratively, the computing device 700 may be a user device, such as a personal computer, laptop computer, tablet computer, mobile phone, or the like. The hardware components of the computing device 700 may be implemented on physical electronic devices, as discussed in greater detail below. The computing device 700 may include more, fewer, and/or alternative elements than those shown in FIG. 7. It is not necessary, however, that all of these generally conventional elements be shown in order to provide an enabling disclosure. Additionally, the general architecture illustrated in FIG. 7 may be used to implement one or more of the other components illustrated in FIG. 1.

As illustrated, the computing device 700 includes a processing unit 702, a network interface 704, a computer readable medium drive 706, and an input/output device interface 708, all of which may communicate with one another by way of a communication bus. The network interface 704 may provide connectivity to one or more networks or computing systems, such as the remote system 106. The processing unit 702 may thus receive information and instructions from other computing systems or services via the network 114. The processing unit 702 may also communicate to and from memory 710 and further provide output information for an optional display (not shown) via the input/output device interface 708. The input/output device interface 708 may also accept input from an optional input device (not shown).

The memory 710 can contain computer program instructions (grouped as units in some embodiments) that the processing unit 702 executes in order to implement one or more aspects of the present disclosure. The memory 710 correspond to one or more tiers of memory devices, including (but not limited to) RAM, 3D XPOINT memory, flash memory, magnetic storage, and the like.

The memory 710 may store an operating system 712 that provides computer program instructions for use by the processing unit 702 in the general administration and operation of the computing device 700. The memory 710 may further include computer program instructions and other information for implementing aspects of the present disclosure. For example, in one embodiment, the memory 710 includes user interface unit instructions 714 for a user interface unit 122 that generates user interfaces (and/or instructions therefor) for display upon the computing device 700, e.g., via a navigation and/or browsing interface such as a browser or application installed on the computing device 700.

In addition to and/or in combination with the user interface unit instructions 714, the memory 710 may include model selection unit instructions 716 for a model selection unit 126 configured to select and generate machine learning models to apply on a received image. The memory 710 may further include base model unit instructions 718 for a base model unit 130 configured to execute and train a base model (e.g., a neural network). The memory 710 may also include work model unit instructions 720 for a work model unit 134 configured to execute one or more work models (e.g., neural networks).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computing processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
as implemented by a computing system comprising one or more computer processors configured to execute specific instructions:
receiving an image to be classified;
generating, using a base model network and the image, a base model output associated with the image;
selecting a subset of work model networks, from a hierarchy of work model networks, for generation of work model output, wherein the subset of work model networks comprises a first work model network from a first level of the hierarchy and a second work model network from a second level of the hierarchy;
subsequent to selecting the subset of work model networks, generating a plurality of work model outputs using the subset of work model networks and the base model output;
displaying an image classification interface configured to accept user input regarding classification of the image;
receiving user interaction data representing a user input to the image classification interface; and
determining a label associated with the image, wherein the label is determined based at least partly on the plurality of work model outputs and the user input.

2. The computer-implemented method of claim 1, further comprising storing the base model output in a cache.

3. The computer-implemented method of claim 2, further comprising loading the base model output from the cache, wherein at least one of the plurality of work model outputs is generated after the base model output is loaded from the cache.

4. The computer-implemented method of claim 1, further comprising:
receiving the base model network and the subset of work model networks from a remote system via a network; and
storing the base model network and the subset of work model networks in a local data store of the computing system.

5. The computer-implemented method of claim 4, further comprising loading the base model network and the subset of work model networks from the local data store, wherein the local data store comprises a browser-based data store.

6. The computer-implemented method of claim 1, wherein generating the plurality of work model outputs comprises generating a first work model output using the first work model network in parallel with generating a second work model output using the second work model network.

7. The computer-implemented method of claim 1, wherein generating the plurality of work model outputs comprises generating a first work model output using the first work model network prior to generating a second work model output using the second work model network.

8. The computer-implemented method of claim 1, wherein a first work model output comprises a first confidence score associated with the label, and a second confidence score associated with a second label.

9. The computer-implemented method of claim 8, further comprising determining to display the label based at least partly on the first confidence score satisfying a threshold.

10. The computer-implemented method of claim 8, further comprising determining to display the label based at least partly on a difference between the first confidence score and the second confidence score.

11. The computer-implemented method of claim 1, further comprising:
receiving a second image selected by a user for classification;
generating, using the base model network and the second image, a second base model output associated with the second image;
generating, using the subset of work model networks and the base model output, a second plurality of work model outputs; and
determining a second label associated with the second image, wherein the second label is determined based at least partly on the second plurality of work model outputs, and wherein the second label is different than the label.

12. A system for classifying images, the system comprising:
a data store storing executable instructions; and
one or more processors in communication with the data store and programmed by the executable instructions to at least:
receive an image to be classified;
generate, using a base model network and the image, a base model output associated with the image;
select a subset of work model networks, from a hierarchy of work model networks, for generation of work model output, wherein the subset of work model networks comprises a first work model network from a first level of the hierarchy and a second work model network from a second level of the hierarchy;
subsequent to selecting the subset of work model networks, generate a plurality of work model outputs using the subset of work model networks and the base model output;
display an image classification interface configured to accept user input regarding classification of the image;
receive user interaction data representing a user input to the image classification interface; and
determine a label associated with the image, wherein the label is determined based at least partly on the plurality of work model outputs and the user input.

13. The system of claim 12, wherein the one or more processors are programmed by further executable instructions to:
store the base model output in a cache; and
load the base model output from the cache, wherein at least one of the plurality of work model outputs is generated after the base model output is loaded from the cache.

14. The system of claim 12, wherein the one or more processors are programmed by further executable instructions to:
receive the base model network and the subset of work model networks from a remote system via a network;
store the base model network and the subset of work model networks in a local data store of the system; and
load the base model network and the subset of work model networks from the local data store, wherein the local data store comprises a browser-based data store.

15. The system of claim 12, wherein to generate the plurality of work model outputs, the one or more processors are programmed by further executable instructions to generate a first work model output using the first work model network in parallel with generating a second work model output using the second work model network.

16. The system of claim 12, wherein to generate the plurality of work model outputs, the one or more processors are programmed by further executable instructions to generate a first work model output using the first work model network prior to generating a second work model output using the second work model network.

17. The system of claim 12, wherein a first work model output comprises a first confidence score associated with the label, and a second confidence score associated with a second label.

18. The system of claim 17, wherein the one or more processors are programmed by further executable instructions to determine to display the label based at least partly on at least one of: the first confidence score satisfying a threshold, or a difference between the first confidence score and the second confidence score.

19. The system of claim 12, wherein the first work model network is selected from a plurality of work model networks of the first level of the hierarchy based at least partly on at least one of: a prior user input received prior to the user input, or a prior work model output generated prior to the plurality of work model outputs.

20. The system of claim 12, wherein the first level of the hierarchy comprises a plurality of work model networks including the first work model network, and wherein, only the first work model network of the plurality of work model networks of the first level of the hierarchy is used to generate a work model output from the base model output.

* * * * *